(12) United States Patent
Oelrich et al.

(10) Patent No.: US 7,777,617 B2
(45) Date of Patent: Aug. 17, 2010

(54) WIRELESS SIGNAL APPARATUS FOR ASSISTING DRIVERS TO BACK LARGE VEHICLES

(75) Inventors: Christopher Lee Oelrich, Highland, CA (US); Curtis John Oelrich, Yucaipa, CA (US)

(73) Assignee: Reverse Control, Inc., Highland, CA (US)

( * ) Notice: Subject to any disclaimer, the term of this patent is extended or adjusted under 35 U.S.C. 154(b) by 136 days.

(21) Appl. No.: 12/144,449

(22) Filed: Jun. 23, 2008

(65) Prior Publication Data
US 2008/0258932 A1    Oct. 23, 2008

Related U.S. Application Data

(63) Continuation of application No. 11/409,767, filed on Apr. 24, 2006, now Pat. No. 7,567,167.

(51) Int. Cl.
*B60Q 1/00* (2006.01)
(52) U.S. Cl. .................... 340/435; 340/436; 340/903
(58) Field of Classification Search .......... 340/901, 340/902, 903, 435, 436, 438, 932.2, 943, 340/539.1, 539.11; 342/70, 71; 180/167; 318/445
See application file for complete search history.

(56) References Cited

U.S. PATENT DOCUMENTS

| | | | |
|---|---|---|---|
| 3,944,972 A | 3/1976 | Chandler | |
| 4,236,594 A | 12/1980 | Ramsperger | |
| 4,843,367 A | 6/1989 | Saito | |
| 5,028,920 A | 7/1991 | Dombrowski | |
| 5,132,665 A | 7/1992 | Hutchisson et al. | |
| 5,208,586 A | 5/1993 | Friberg et al. | |
| RE34,773 E | 11/1994 | Dombrowski | |
| 5,746,284 A | 5/1998 | Johnson | |
| 5,780,723 A | 7/1998 | Koo | |
| 5,945,907 A | 8/1999 | Yaron et al. | |
| 6,025,778 A | 2/2000 | Dietz et al. | |
| 6,163,253 A | 12/2000 | Yaron et al. | |
| 6,268,803 B1 | 7/2001 | Gunderson et al. | |
| 6,696,983 B2 * | 2/2004 | Tang et al. | 340/989 |

(Continued)

FOREIGN PATENT DOCUMENTS

JP        60071350 A2    4/1985

OTHER PUBLICATIONS

Notice of Allowance for U.S. Appl. No. 11/409,767, Mar. 25, 2008, subsequently withdrawn.

(Continued)

*Primary Examiner*—Van T. Trieu
(74) *Attorney, Agent, or Firm*—Knobbe Martens Olson & Bear, LLP

(57) ABSTRACT

A back-up safety apparatus and method that enables the driver of a large vehicle with inherent rear blind spots to receive signals, to proceed or stop, based on changing safe or unsafe conditions. A spotter who monitors the vehicle's progress from a safe and remote vantage point in the rear, uses a hand held wireless transmitter to signal the driver. The transmitter also provides a deadman style safety switch for the benefit of the spotter that will automatically signal the driver to stop if the spotter becomes disabled, falls or drops the transmitter.

22 Claims, 3 Drawing Sheets

U.S. PATENT DOCUMENTS

| | | | |
|---|---|---|---|
| 6,707,391 B1 * | 3/2004 | Monroe | 340/901 |
| 6,819,231 B2 | 11/2004 | Berberich et al. | |
| 6,873,250 B2 | 3/2005 | Viana et al. | |
| 6,950,019 B2 | 9/2005 | Bellone et al. | |
| 7,148,794 B2 | 12/2006 | Stigall | |
| 7,463,137 B2 * | 12/2008 | Wishart et al. | 340/431 |
| 2002/0005780 A1 | 1/2002 | Ehrlich et al. | |
| 2002/0145522 A1 | 10/2002 | Pembroke | |
| 2002/0154007 A1 | 10/2002 | Yang | |
| 2007/0080584 A1 | 4/2007 | Li | |
| 2007/0182820 A1 | 8/2007 | Wang | |
| 2009/0115630 A1 | 5/2009 | Oelrich et al. | |

OTHER PUBLICATIONS

Office Action dated Jul. 28, 2008 for U.S. Appl. No. 11/409,767.
Response Office Action with Interview Summary dated Jul. 28, 2008 filed Sep. 26, 2008, for U.S. Appl. No. 11/409,767.
U.S. Appl. No. 11/409,767, filed Apr. 24, 2006, Oelrich, Office Action Jul. 28, 2008, Notice of Allowance Mar. 23, 2009.
U.S. Appl. No. 12/263,162, filed Nov. 31, 2008, Oelrich.

* cited by examiner

WIRELESS SIGNAL APPARATUS FOR ASSISTING DRIVERS TO BACK LARGE VEHICLES

CROSS-REFERENCE TO RELATED APPLICATIONS

This application is a continuation of U.S. application Ser. No. 11/409,767 filed Apr. 24, 2006, now U.S. Pat. No. 7,567, 167 entitled "WIRELESS SIGNAL APPARATUS FOR ASSISTING DRIVERS TO BACK LARGE VEHICLES," which is hereby incorporated by reference in its entirety.

BACKGROUND OF THE INVENTION

1. Field of the Invention

The present invention relates generally to backing large vehicles that are characterized by blind spots in the rear and, more particularly, to spotters who often assist drivers by watching the rear, standing ready to communicate a signal to stop.

2. Description of the Related Art

Large vehicles in enormous numbers such as trucks of all shapes and sizes routinely deliver goods and services to our society each day. Fire engines, recreational vehicles and other types of big rigs populate our roadways as well. All drivers of such vehicles in the normal course of operation must back them up. In the case of delivery trucks and fire engines for example, they must backed numerous times in the course of a normal day.

Unlike an automobile's center cab mounted rear view mirror, many large vehicles are characterized by trailers or high storage boxes that obstruct a direct rearward view through a back window. Instead, drivers of large vehicles such as these must rely on side mounted mirrors, which by nature provide only a limited view of the rear.

Backing large vehicles with inherent blind spots is difficult and dangerous to the extent that often, when available, a spotter in the rear is used to assist the driver in safely backing to a desired position. The spotter generally watches from a rear vantage point monitoring changing conditions and stands ready to communicate a signal to stop.

The all important signal to stop has been accomplished traditionally through a hand signal visualized in one of the drivers side mount mirrors. Other methods to signal a driver include such things as shouts to stop, whistles, waved red flags and blinking flashlights, to cite a few. These methods are effective only to the extent that the driver can see the spotter in one of the mirrors, or hear over the noise of the engine and surrounding conditions. Backing at night, in inclement weather, heavy rain, fog, shadows and glare from the sun can severely hamper the drivers ability to see a signal to stop from a spotter. In addition, as the spotter walks backward behind the backing vehicle he routinely drifts in and out of the drivers sight in the mirrors. These situations and conditions can critically affect or delay an emergency signal to stop.

In recent years, remote camera systems have been developed to assist drivers. For example, U.S. Pat. No. 6,819,231 discloses a device for parking or maneuvering vehicles using a rear facing video camera and a graphic display in the cab. In addition, beeping sensors mounted on vehicle bumpers have been developed to assist the driver in the absence of a spotter, as disclosed in U.S. Pat. Nos. 6,873,250 and 6,268,803. These systems have proven to be helpful to a point, but are considered "passive" in the sense that a driver must still look in his mirrors and be responsible for knowing what is behind him as he backs. Further, these types of systems are not fool proof.

Camera systems for example, fail to provide a driver with depth perception and peripheral vision. Because of this, the manufacturers of such devices generally recommend that the rear view mirrors continue as the primary focus of the driver when backing. A driver who is advised by a camera system manufacturer not to back while looking at the camera monitor, cannot therefore visualize in such a system, changing conditions in the rear blind spot. Rear sensor systems suffer similarly from the fact that they generally cannot distinguish between normally occurring objects and those that would pose a threat of collision. This tends to generate false signals to stop and creates a situation where the driver can become de-sensitized to the system.

Intercom systems using voice communication between the driver and a spotter are another approach to the problem of backing. On the surface this would appear to be a good solution, but factors such as exterior noise can cover a voice command. Common back-up beepers, which are in use widely by large vehicles have a tendency, for example, to overshadow intercom voice communications. Wireless versions of intercom systems can suffer from broken signals, static and radio signal interference.

Fire departments, for many years, had members stand on the fire engine's tailboard facing the rear to act as a safety spotter while the rig backed up. The firefighter on the tailboard would use a button mounted on the back of the fire engine that actuated a bell in the cab signaling the driver. One ring meant stop now. Two rings meant its ok to pull forward, and three rings meant its ok to back-up. This simple and very effective system of using a spotter on the tailboard with a direct and positive ability to communicate an emergency stop signal has contributed enormously to overall safety while backing fire engines down through the years. While difficult to quantify, there is no doubt that thousands of accidents were avoided by using this method.

In August of 2004 the fire service thinking on this subject was shaken to the core. A tragic backing accident took the life of Jamie Foster, a young probationary fire fighter working for the City of Los Angeles. Jamie and the other members of her Engine Company had just battled a structure fire, and were preparing to return to quarters. Jamie was on the tailboard acting as a spotter, helping the driver slowly back down a residential street. Suddenly, she lost consciousness and collapsed unable to push the button to signal the driver to stop. She fell off the tailboard and into the path of the apparatus rear wheels. The driver had no way of knowing what had happened and continued to back-up, crushing her to death. This terrible incident inspired the development of the current invention described within this application.

Government agencies such as the Occupational Safety and Health Association, the National Institute for Occupational Safety and Health and the National Fire Protection Association, have published documents addressing the issue of spotters riding on a fire engine's tailboard. In concert, they now recommend that no person stand or ride on any fire apparatus tailboard while the vehicle is in motion. This of course has placed the fire fighter spotter back on the ground, using hand signals to communicate. What is troublesome is that this new ruling did not effectively solve the problem. In fact, the spotter, though not on the fire engine tailboard, is still operating in close proximity to the backing fire engine. It has been argued that the spotter may now be in even greater danger. Nevertheless, the majority of fire departments in this country today routinely utilize a spotter walking backwards in the rear and hand signals to back their apparatus.

Accidents, injuries and deaths have occurred in very large numbers from incidents involving backing such vehicles.

Using a spotter greatly enhances a drivers ability to back safely, however a spotter generally does so in harms way of the backing vehicle. What is tantamount is providing a spotter the ability to instantly and positively signal a driver to stop, while at the same time establishing a way to protect him should he fall or become disabled while standing in or near the path of the backing apparatus.

The spotting and signaling methods heretofore known, as described above, and common to most large trucks and vehicles during backing, suffer from a number of disadvantages:

(a) Visual signals watched for in a drivers mirror can easily be missed or critically delayed due to adverse conditions, noise, weather and or other hindrances.

(b) A driver looking back and forth between his two side mirrors, as is normal while backing, can result in delayed or missed signals to stop, greatly increasing the possibility of an accident.

(c) In the event that a spotter is suddenly disabled, falls, or suffers a sudden loss of consciousness, the driver may be left unaware and continue backing, greatly increasing the possibility of serious injury or accident.

(d) For hand signals to be seen by the driver, the spotter must stay in relatively close proximity to the backing vehicle increasing the danger of being struck or run over.

(e) Usually, a visual hand signal alone is used to communicate with the driver stimulating only one of his physical senses.

(f) Noise from the engine and other surrounding conditions may cover a shout or a whistle to stop, increasing the possibility of an accident.

OBJECTS AND ADVANTAGES OF THE INVENTION (a) The new remote signaling apparatus provides spotters with a positive, clear and instantaneous method of communicating signals to the driver of a large vehicle.

(b) It eliminates the need for the driver to continually visualize the spotter in a rear view mirror.

(c) It greatly reduces the possibility of delayed or missed signals.

(d) It will protect the spotter in case he becomes disabled in any way through the use of an automatic and instantaneous deadman style safety button.

(e) In vehicles not equipped with back-up beepers, the spotter will now know when the vehicle is in the reverse gear through the enunciation of the signal device or devices in the rear.

(f) It allows the spotter to monitor the backing vehicle from a much greater distance, back and out of its general path, enhancing safety.

(g) It can signal using audible buzzers, visual lights and or vibrating devices simultaneously to stimulate up to three different physical senses, thereby improving the driver's perception/reaction time.

(h) It is designed to fail with a signal to stop, in the event of a battery or other system malfunction.

(i) It can be de-activated if the driver must back without the aid of a spotter.

SUMMARY OF THE INVENTION

The apparatus of the invention is characterized by a two button handheld wireless transmitter used by a safety spotter to signal a driver who is backing. Audible buzzers and visual lights in the cabin and on the back of the vehicle are responsive to the transmitter through its relationship to a receiver mounted on board the vehicle.

The first button on the transmitter acts momentarily to activate the buzzers and lights as a signal to the driver. The spotter signals the driver with a simple predetermined code system. One signal means stop immediately. Two signals means its ok to go forward. Three signals indicates its ok to back-up.

The second button acts oppositely in relation to the first. When the vehicle is engaged in its reverse gear, the lights and buzzers are activated in constant mode until the second button, a deadman style safety button is depressed, canceling the constant signal. It must be continually held down by the spotter during backing operations or else, upon its release, the driver receives an automatic and immediate signal to stop. This protects the spotter should he fall, become disabled or drop the transmitter.

Other objects and advantages of the invention will become apparent from consideration of the following description taken in conjunction with the accompanying drawings.

Figure 1:
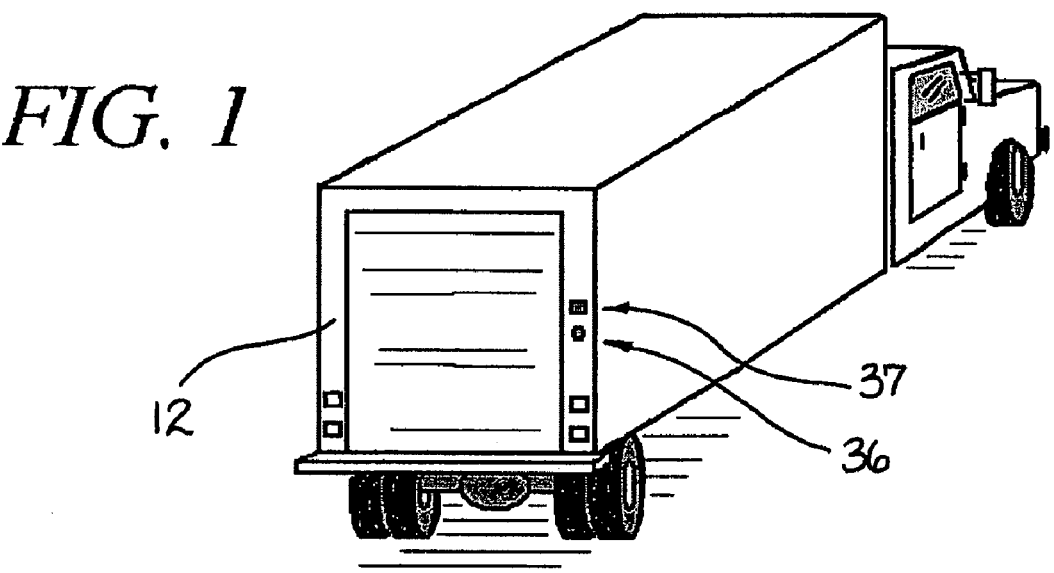
FIG. 1 is a perspective view of a large vehicle and a spotter in the rear assisting the driver to safely back up.
Figure 1:
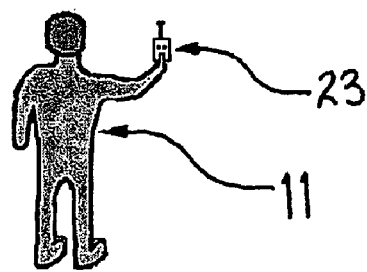

REFERENCE NUMERALS ARE BRIEFLY DESCRIBED AS 11 spotter;
12 vehicle;
13 driver;
21 signal button;
22 safety button;
23 wireless transmitter;
30 wireless receiver;
31 left-side mirror;
32 right-side mirror;
33 left-side cab light;
34 right-side cab light;
35 cab buzzer;
36 rear light;
37 rear buzzer;
38 reverse transmission switch;
39 de-activation switch;
41 relay (for signal button 21);
42 relay (for safety button 22);
43 vehicle battery; and
44 diode.

DETAILED DESCRIPTION OF THE PREFERRED EMBODIMENT

Figure 2:
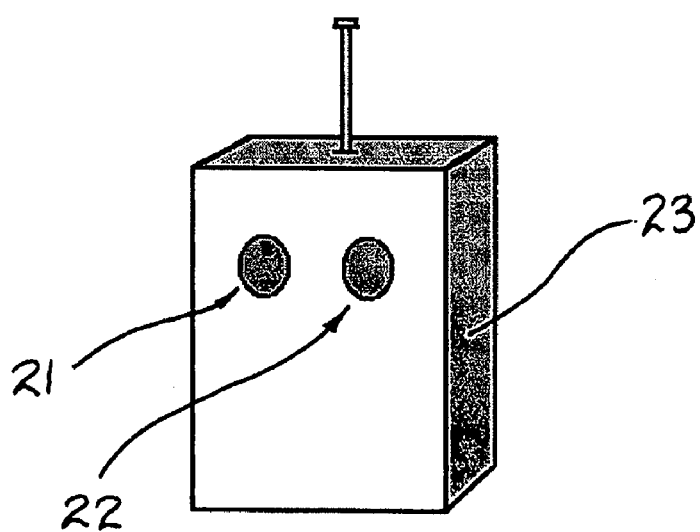
FIG. 2 is a perspective of the battery powered, hand-held, two function, wireless remote controller; the antenna shown may be internal or external.
Figure 3:
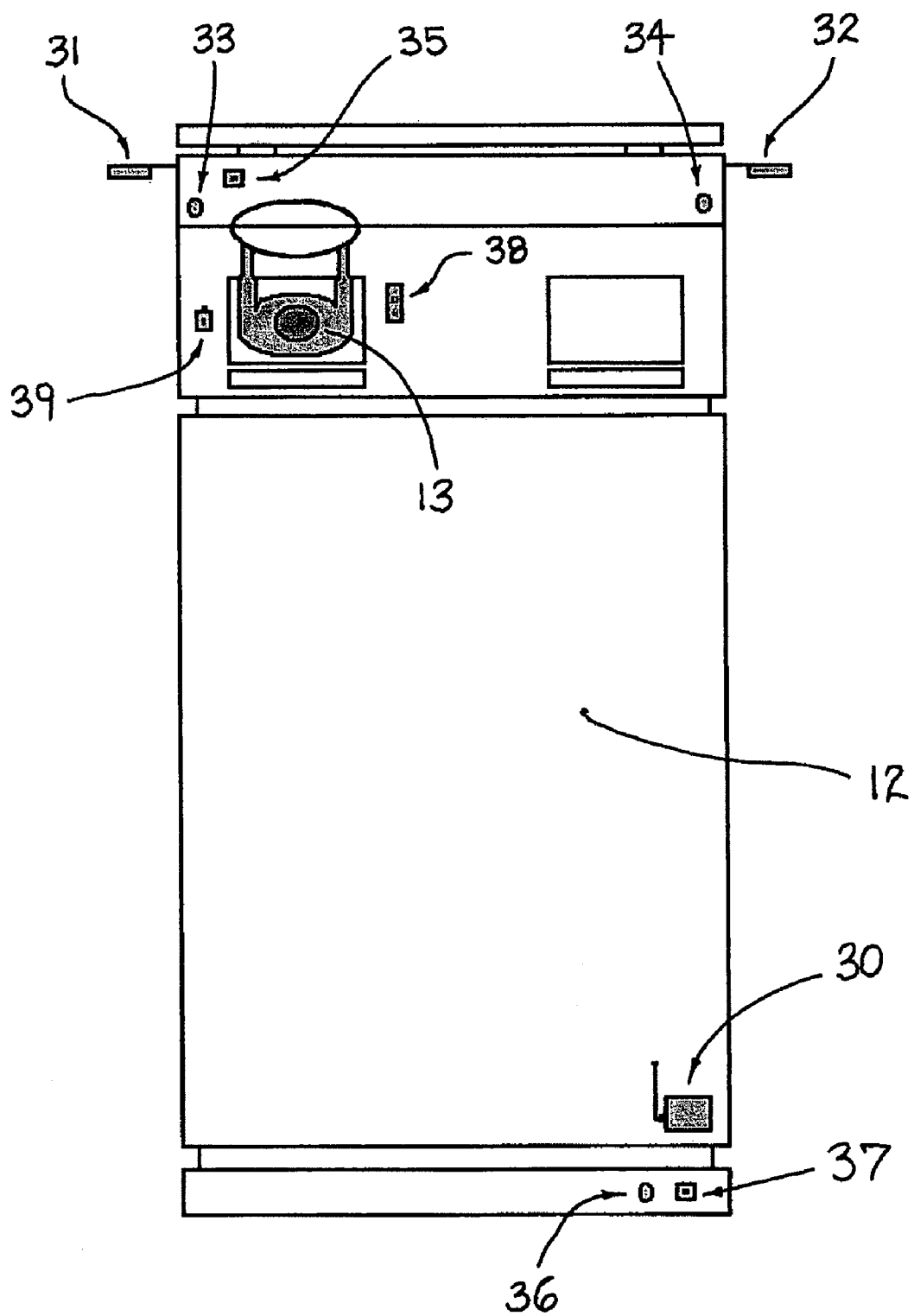
FIG. 3 is a top, cutaway, view of a large vehicle and the mounted components of the wireless signal apparatus embodying the present invention.

A preferred embodiment of the present invention is partially illustrated in FIGS. 1 and 2 wherein a safety member, spotter 11, uses the invention to assist in the process of backing a large vehicle, greatly reducing the possibility of an accident. In FIG. 3, a top view of the invention is shown to be an apparatus of electrical components mounted on vehicle 12 and controlled remotely by transmitter 23, FIG. 2. It is used by spotter 11, who in FIG. 1 is positioned in the rear, ready to signal driver 13 shown in FIG. 3, to stop, pull forward or back-up.

Signaling components, concurrently activated, comprising buzzers and lights, mounted in the cab as well as on the rear of vehicle 12, are responsive momentarily to signal button 21 shown in FIG. 2. The audible buzz and visual light signals are enunciated in the cab for the attention and appropriate response of driver 13. The invention eliminates the need to visualize spotter 11 in order to receive a signal to stop. In the rear, the light and buzzer enunciates feedback to spotter 11, indicating to him that the system is indeed receiving the desired wireless signals.

In FIGS. 1 and 2, momentarily activating signal button 21, and using a simple predetermined code language such as:
1. one signal means to immediately stop;
2. two signals means ok to pull forward;
3. three signals means ok to back-up;

spotter 11 thereby communicates with driver 13, as changing conditions warrant. The signals are sufficiently loud and bright, employing audible and visual senses at the same time, thereby decreasing the possibility of a missed signal.

In FIG. 1 spotter 11 is shown holding wireless transmitter 23 which remotely communicates signals to components of the invention mounted on vehicle 12. Rear buzzer 37 and rear light 36 are shown on the back of vehicle 12 and comprise a portion of the components. As the spotter depresses buttons on controller 23 he can visualize rear light 36 and hear rear buzzer 37 responding to his activation. They provide thereby an indication of a properly working system to spotter 11, in that they are wired to respond simultaneously to the other signal devices mounted inside the cab of vehicle 12.

In FIG. 1, spotter 11 is also shown in typical position well back and off to the side of the path of backing vehicle 12, thereby maintaining a safer distance from which to monitor its progress than has been common in the past. Spotter 11 in this position can observe the blind spots suffered by the driver of vehicle 12, and can immediately signal him using controller 23, should changing conditions call for the vehicle to be stopped. It will be appreciated by those skilled in the art that Spotter 11 need not be visible to the driver in his mirrors to communicate signals. Spotter 11, through the invention, adds his full depth perception, peripheral vision and judgment to driver 13 shown in FIG. 1, who is essentially blind with respect to his rearward direction of travel while backing.

FIG. 2 is a close up view of two function, hand-held, wireless transmitter 23. It is of typical size to fit comfortably in the palm of one's hand enabling the thumb to be used to activate buttons 21 and 22. Buttons 21 and 22 perform separate and distinct signal functions, communicating wirelessly with receiver 30 shown in FIGS. 3 and 4. Relays 41 and 42 of receiver 30 shown in FIG. 4, correspond respectfully to Buttons 21 and 22 shown in FIG. 2, thus completing the wireless link between transmitter 23 and receiver 30.

FIG. 3 is a top cutaway view of the invention's components installed in various locations of vehicle 11. Cab lights 33 and 34, shown on each side of the dashboard of vehicle 11, are intended for placement within the driver's field of vision respective to mirrors 31 and 32. They provide the important and very effective visual aspect of the signal system as the driver gazes into his mirrors while backing. Their location is therefore specific and critical in relation to mirrors 31 and 32 and the drivers field of vision. Cab buzzer 35 is the audible aspect of the invention's signal system. It is shown on the dashboard intended to be within range of the driver's hearing. Cab buzzer 35 is further intended to be as loud as common devices used in vehicles to sound other types of warning alarms such as, for example, low air pressure warning devices, which are also used to signal a stop.

In FIG. 3, whenever driver 13 places the transmission gear selector into reverse, reverse transmission switch 38 activates power to the portion of the circuit that functions as deadman safety button 22, shown in FIG. 2. The activation of reverse transmission switch 38 in turn activates all buzzers and lights in the system until safety button 22 is depressed and held by spotter 11. New and reliable protection for spotter 11 is realized by this important feature of the invention.

Conversely, de-activation switch 39 is used by driver 13 to cancel the function of safety button 22 in the absence of a spotter. This prevents the lights and buzzers from sounding when vehicle 12 is in reverse and no spotter is available to depress safety button 22. Driver 13 is, in this case, backing alone and it will be appreciated by those skilled in the art that annoying lights and buzzers are muted.

Figure 4:
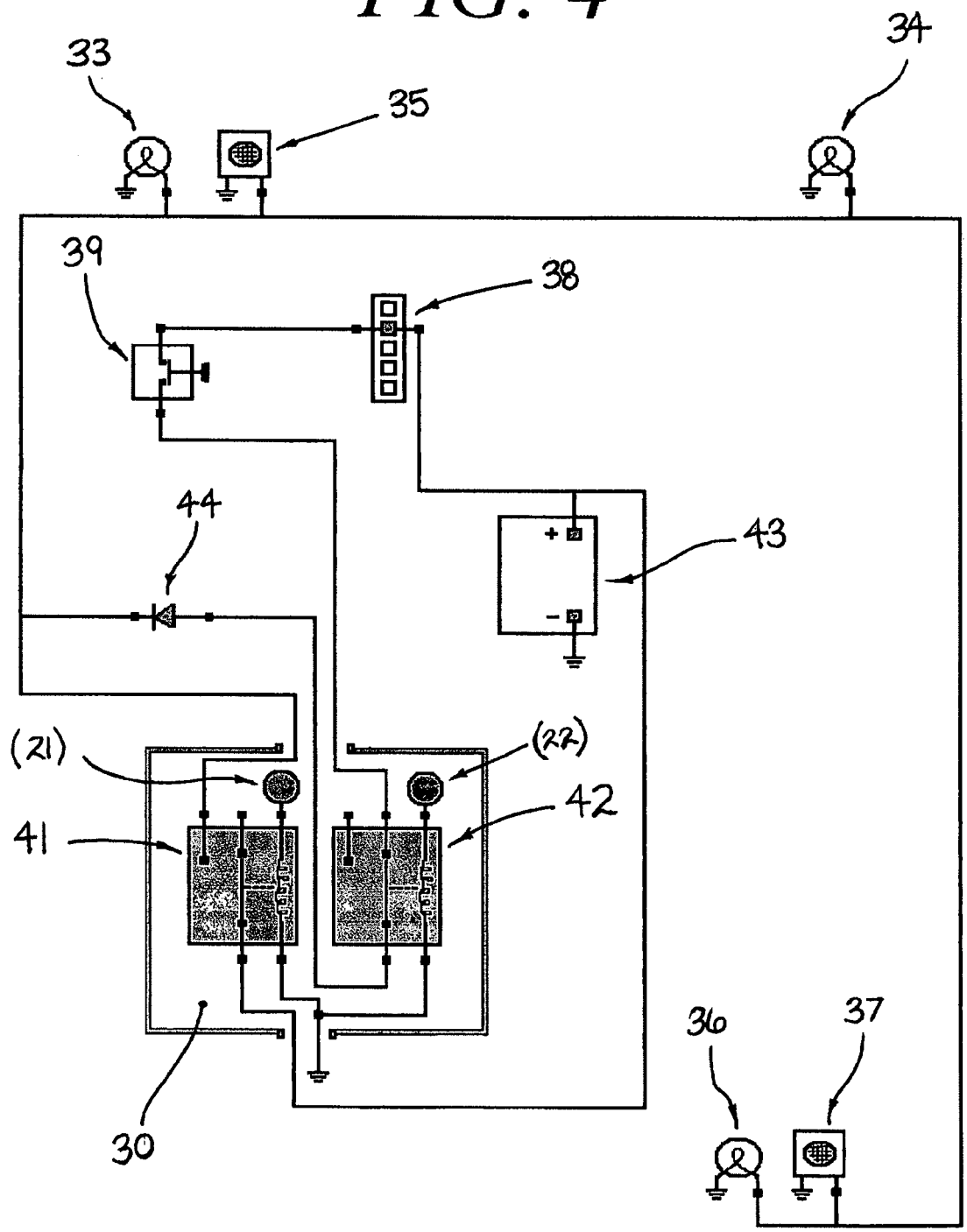
FIG. 4 is an electrical schematic of the components embodying the present invention, with the exception of the hand-held transmitter.

FIG. 4 shows an electrical schematic of the present invention and demonstrates how to make the apparatus and connect it to a vehicle. Albeit interconnected, there are two distinct functions to the circuitry. One relates to signal button 21, which activates the basic signaling devices. Conversely, the other relates to safety button 22, which interrupts the signaling devices and as such becomes the deadman function while depressed by spotter 11, FIG. 1.

In regard to signal button 21; FIG. 4 shows power from battery 43 connected to relay switch 41 inside of wireless receiver 30 and is interrupted. Relay 41 is responsive to signal button 21 on transmitter 23, FIG. 2. Depressing signal button 21, which is momentary in design, causes relay 41 to switch power to light 33, light 34, buzzer 35, light 36, and buzzer 37, initiating simultaneous activation. Releasing button 21 cancels the momentary activation of lights and buzzers.

In regard to safety button 22; power from reverse transmission switch 38 is connected to relay 42 inside receiver 30. Relay 42 is responsive to safety button 22 on transmitter 23, FIG. 2. Power is activated to relay 42 when the reverse gear of the transmission is selected by driver 13, FIG. 3. Power in this case travels through relay 42 uninterrupted, continues through diode 44 and activates light 33, light 34, buzzer 35, light 36 and buzzer 37 constant and continuous. Depressing and holding safety button 22, which is momentary in design, cancels the activation of lights and buzzers as long as it is held down thereby creating the deadman safety function. Diode 44 prevents a back flow of electricity if signal button 21 is depressed while the vehicle is in reverse.

Transmitter 23 and receiver 30 are key components of the invention and are made in compliance with industrial standards of quality, having resistance to the effects of wet weather, dust and the elements. Transmitter 23 is further capable of sustaining normal wear and tear associated with the stated application of the invention.

Those skilled in the art will appreciate that transmitter 23 and receiver 30 are capable of tens of thousands of independent and easily programmable codes, making it completely feasible for a plurality of vehicles to operate in close proximity to one another with no interference.

OPERATION OF THE INVENTION

The apparatus of the present invention is used in method as follows:

(a) driver 13 stops vehicle 12 in preparation to back to a desired position, and waits for spotter 11 to obtain transmitter 23;

(b) spotter 11 obtains transmitter 23 and positions himself in the rear of waiting vehicle 12, similar to what is depicted in FIG. 1 or as conditions dictate;

(c) spotter 11 visualizes a clear path for vehicle 12 and signals driver 13 that it is ok to back-up (three momentary signals). As spotter 11 signals driver 13 he listens for buzzer 37 and looks for light 36 to enunciate his own signals on the rear of vehicle 12 as feedback to confirm a properly working system;

(d) driver 13 having received the signal to back, places the transmission in reverse, watches for lights 33, 34 and buzzer 35 to enunciate in a constant fashion;

(e) with vehicle 12 in reverse and the devices fore and aft enunciating, spotter 11 depresses safety button 22 and holds it down, canceling the signal to stop and clearing driver 13 to back-up. Spotter 11 has further confirmation of a properly working system at this point;

(f) driver 13 backs to the desired position while enjoying the benefit of spotter 11 monitoring vehicle 12's progress, signaling a perceived need to stop by simply letting go of safety button 22;

(g) if spotter 11 stumbles, falls, drops transmitter 23 and or is disabled in any way driver 13 will receive an immediate and automatic signal to stop as button 22 is naturally released;

(h) if the power supply or switching mechanism inside of transmitter 23 fails, relay 42 will return to it's normally closed position, and driver 13 will receive an immediate signal to stop; and (i) if driver 13 must back the vehicle without the aid of spotter 11, he can disable power to relay 42 using deactivation switch 39, and thereby silence the automatic enunciation of signal devices that occurs when he selects the reverse gear of the transmission.

What is claimed is:

1. A back-up safety apparatus that enables a driver of a vehicle to receive indications from a spotter positioned outside of the vehicle in a position that provides the spotter with a view of one or more blind spots of the driver positioned in a driver seat of the vehicle, the apparatus comprising:
    a handheld wireless transmitter configured for control by the spotter, the handheld wireless transmitter comprising a button having only two positions, wherein the handheld wireless transmitter is configured to transmit a first wireless signal only when the button is depressed by the spotter so that the button is in a first position;
    a wireless receiver configured to be positioned on the vehicle that is capable of detecting reception of the first wireless signal that is transmitted from the handheld wireless transmitter; and
    a first signal device configured to be positioned on the vehicle such that the driver of the vehicle can see and/or hear the first signal device when the driver is operating the vehicle, wherein the first signal device is configured to provide a first audio and/or visual indication indicating that the driver is clear to back-up the vehicle in response to the wireless receiver receiving the first wireless signal, and wherein the first signal device is configured to provide a second audio and/or visual indication indicating that the driver is not clear to back-up the vehicle in response to the wireless receiver not receiving the first wireless signal when the button is in the second position.

2. The back-up safety apparatus of claim 1, wherein the first signal device comprises a light source and the first audio and/or visual indication indicating that the driver is clear to back-up comprises emitting light from the light source.

3. The back-up safety apparatus of claim 2, wherein the first audio and/or visual indication indicating that the driver is clear to back-up comprises periodically emitting a predetermined quantity of light pulses from the light source.

4. The back-up safety apparatus of claim 1, further comprising one or more audible or tactile signal devices configured to provide indications to the driver based on whether the first signal is received by the wireless receiver.

5. The back-up safety apparatus of claim 1, wherein the first signal device does not provide the first audio and/or visual indication unless the vehicle transmission is engaged in reverse.

6. The back-up safety apparatus of claim 1, further comprising a second signal device configured to be positioned on the rear of the vehicle, wherein the second signal device is configured to provide the first and second audio and/or visual indications concurrently with the respective first and second audio and/or visual indications provided by the first signal device.

7. The back-up safety apparatus of claim 1, wherein the vehicle comprises a fire fighting vehicle.

8. A vehicle safety system, comprising:
    a wireless receiver in communication with at least one indicator capable of being perceived by a driver of a vehicle; and
    a wireless transmitter comprising a selector having only a first position and a second position, wherein the wireless transmitter initiates transmission of a signal from the wireless transmitter only when the selector is in the first position,
    wherein the at least one indicator is configured to indicate whether the vehicle is safe or not safe to move based at least on whether the wireless receiver receives the signal from the wireless transmitter.

9. The safety system of claim 8, wherein in response to engaging the vehicle transmission in reverse, the at least one indicator indicates that the vehicle is not safe to move and when the signal is received by the wireless receiver while the vehicle transmission is engaged in reverse, the at least one indicator indicates that the vehicle is safe to move.

10. The safety system of claim 8, wherein the wireless transmitter further comprises a second selector that, when activated while the first selector is activated, causes the first plurality of indicators to activate.

11. The safety system of claim 8, wherein the first plurality of indicators comprise at least one of an audio indicator and a visual indicator.

12. The safety system of claim 11, wherein at least one of the indicators is configured for placement on the vehicle within the driver's field of vision.

13. The safety system of claim 11, wherein at least one of the indicators is configured for placement on the vehicle within the driver's range of hearing.

14. The safety system of claim 8, further comprising a second one or more indicators positioned on the rear of the vehicle and configured to activate and deactivate, respectively, substantially concurrently with activation and deactivation of the at least one indicator.

15. The safety system of claim 8, wherein the first and second selectors of the wireless transmitter are activated from a position outside of the vehicle.

16. The safety system of claim 8, wherein the first selector comprises a button of the wireless transmitter.

17. A method of signaling a driver of a vehicle of a spotter's indications regarding backing of the vehicle, wherein the driver is positioned to drive the vehicle at least in reverse and the spotter is positioned outside of the vehicle in a position to view at least a portion of an intended backing path to be taken by the vehicle, the method comprising:

emitting a first signal from an indicator positioned on the vehicle such that the first signal is perceivable by the driver, the first signal indicating that the driver should not move the vehicle;

in response to receiving a first wireless signal from a handheld transmitter held by the spotter, emitting a second signal from the indicator, the second signal indicating that the driver may move the vehicle, wherein the handheld transmitter does not include a mechanism for providing indications of steering directions; and in response to not receiving the first wireless signal, after having received the first wireless signal, emitting the first signal from the indicator indicating that the driver should not move the vehicle.

18. The method of claim 17, wherein the indicator comprises one or more of a light and a speaker.

19. The method of claim 17, wherein the first signal from the indicator comprises constant emission of a first frequency audio signal.

20. The method of claim 17, wherein the second signal from the indicator comprises emission of a predetermined quantity of audio pulses at a second frequency, followed by emission of no audio signal.

21. The method of claim 17, wherein the first signal from the indicator is emitted in response to the vehicle initially being shifted into reverse.

22. A vehicle safety kit comprising:

an indicator configured for placement so that the indicator is perceivable by a driver of a vehicle;

a wireless receiver configured to communicate with the indicator; and a wireless transmitter comprising a first selector that initiates transmission of a signal from the wireless transmitter, wherein the wireless transmitter does not include a mechanism for providing indications of left or right steering directions;

wherein the wireless receiver is configured to cause the indicator to indicate whether the vehicle is safe or not safe to move based at least on whether the wireless receiver receives the signal from the wireless transmitter.

* * * * *